United States Patent
Newhouse

(10) Patent No.: US 10,641,432 B2
(45) Date of Patent: May 5, 2020

(54) PRESSURE VESSEL LINER VENTING VIA NANOTEXTURED SURFACE

(71) Applicant: Hexagon Technology AS, Alesund (NO)

(72) Inventor: Norman L. Newhouse, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 0 days.

(21) Appl. No.: 16/114,799

(22) Filed: Aug. 28, 2018

(65) Prior Publication Data
US 2018/0363853 A1   Dec. 20, 2018

Related U.S. Application Data

(63) Continuation of application No. 15/485,483, filed on Apr. 12, 2017, now Pat. No. 10,088,110.

(Continued)

(51) Int. Cl.
*F17C 13/00* (2006.01)
*F17C 1/06* (2006.01)
(Continued)

(52) U.S. Cl.
CPC .............. *F17C 13/002* (2013.01); *F17C 1/06* (2013.01); *F17C 1/16* (2013.01); *B82Y 40/00* (2013.01);
(Continued)

(58) Field of Classification Search
CPC . F17C 13/002; F17C 1/10; F17C 1/02; B82Y 40/00; C09K 13/00; C23F 1/04;
(Continued)

(56) References Cited

U.S. PATENT DOCUMENTS

| 6,361,703 B1 * | 3/2002 | Dickey ................. B29C 33/424 216/10 |
| 9,618,160 B2 | 4/2017 | Eihusen et al. |

(Continued)

FOREIGN PATENT DOCUMENTS

| EP | 2889527 A2 | 7/2015 |
| RU | 45503 U1 | 5/2005 |

(Continued)

OTHER PUBLICATIONS

Office Action in corresponding Canadian patent application No. 3,021,532, dated Nov. 1, 2018.

(Continued)

*Primary Examiner* — Robert J Hicks
(74) *Attorney, Agent, or Firm* — Mai-Tram D. Lauer; Westman, Champlin & Koehler, P.A.

(57) ABSTRACT

A pressure vessel has a first end with a first boss, the first boss having a first outer surface. The vessel includes a liner having a second outer surface, a shell disposed over the second outer surface, and a first vent. The first vent is formed onto at least a portion of the first outer surface and at least a portion of the second outer surface. The first vent includes a texture that provides a higher rate of gas flow through the first vent than through a portion of an interface of the liner and shell lacking the texture. In another aspect, a pressure vessel has a first end and a second end, a plurality of first longitudinal vents and a plurality of second longitudinal vents. At least one of first longitudinal vents is circumferentially offset around the pressure vessel from at least one of the second longitudinal vents.

16 Claims, 4 Drawing Sheets

Related U.S. Application Data

(60) Provisional application No. 62/337,450, filed on May 17, 2016.

(51) Int. Cl.
    *F17C 1/16*     (2006.01)
    *B82Y 40/00*     (2011.01)
    *C09K 13/00*     (2006.01)
    *C23F 1/00*     (2006.01)
    *C23F 4/04*     (2006.01)

(52) U.S. Cl.
CPC ............. *C09K 13/00* (2013.01); *C23F 1/00* (2013.01); *C23F 4/04* (2013.01); *F17C 2201/0109* (2013.01); *F17C 2201/056* (2013.01); *F17C 2203/0604* (2013.01); *F17C 2203/066* (2013.01); *F17C 2203/067* (2013.01); *F17C 2203/0619* (2013.01); *F17C 2203/0621* (2013.01); *F17C 2203/0636* (2013.01); *F17C 2203/0663* (2013.01); *F17C 2205/0305* (2013.01); *F17C 2209/2154* (2013.01); *F17C 2221/011* (2013.01); *F17C 2221/012* (2013.01); *F17C 2221/014* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/035* (2013.01); *F17C 2260/011* (2013.01); *F17C 2260/037* (2013.01); *F17C 2260/038* (2013.01); *Y02E 60/321* (2013.01)

(58) Field of Classification Search
CPC ...... C23F 1/02; C23F 1/10; C23F 1/00; C23F 1/44; C23F 4/04; C23F 4/00
USPC ......... 220/582, 586, 581, 62.15, 367.1, 374, 220/373; 427/555; 216/8
See application file for complete search history.

(56) References Cited

U.S. PATENT DOCUMENTS

| | | | |
|---|---|---|---|
| 2004/0033679 | A1* | 2/2004 | Jacobson ............... B82Y 10/00 438/510 |
| 2007/0183959 | A1* | 8/2007 | Charlier ................ B01J 19/088 423/447.1 |
| 2015/0140837 | A1* | 5/2015 | Chemin ................ B29C 43/12 438/781 |

FOREIGN PATENT DOCUMENTS

| | | |
|---|---|---|
| RU | 2507436 C2 | 2/2014 |
| WO | 2010/091062 A1 | 8/2010 |

OTHER PUBLICATIONS

Examination Report in corresponding Australian patent application No. 2017267404, dated Nov. 28, 2018.
Official Action in corresponding Russian patent application No. 2018142766, dated Jun. 18, 2019.
Search Report in corresponding Russian patent application No. 2018142766, dated Jun. 18, 2019.
European Patent Office Communication in corresponding European patent application No. 17721295.8, dated Jun. 19, 2019.
Office Action in corresponding Chinese patent application No. 201780030716.8, dated Apr. 26, 2019.
Search Report in corresponding Chinese patent application No. 201780030716.8, dated Apr. 18, 2019.
Office Action in corresponding Canadian patent application No. 3,021,532, dated Mar. 22, 2019.
Office Action in corresponding Korean patent application No. 10-2018-7033569, dated Mar. 21, 2019.

* cited by examiner

PRESSURE VESSEL LINER VENTING VIA NANOTEXTURED SURFACE

CROSS REFERENCE TO RELATED APPLICATION

This application is a continuation of U.S. patent application Ser. No. 15/485,483, filed Apr. 12, 2017, and claims the benefit of priority from U.S. Provisional Patent Application No. 62/337,450, filed May 17, 2016, both entitled "Pressure Vessel Liner Venting via Nanotextured Surface," both of which are hereby incorporated by reference in their entirety.

BACKGROUND

Pressure vessels are commonly used for containing a variety of fluids under pressure, such as storing hydrogen, oxygen, natural gas, nitrogen, propane, methane, and other fuels, for example. Suitable container shell materials include laminated layers of wound fiberglass filaments or other synthetic filaments bonded together by a thermal-setting or thermoplastic resin. A polymeric or other non-metallic resilient liner or bladder often is disposed within the composite shell to seal the vessel and prevent internal fluids from contacting the composite material. The composite construction of the vessels provides numerous advantages such as lightness in weight and resistance to corrosion, fatigue and catastrophic failure. These attributes are due at least in part to the high specific strengths of the reinforcing fibers or filaments that are typically oriented in the direction of the principal forces in the construction of the pressure vessels.

FIGS. 1 and 2 illustrate a conventional elongated pressure vessel 10, such as that disclosed in U.S. Pat. No. 5,476,189, entitled "Pressure vessel with damage mitigating system," which is hereby incorporated by reference. Vessel 10 has a main body section 18 with end sections 14. A boss 16, typically constructed of aluminum, is provided at one or both ends of the vessel 10 to provide a port for communicating with the interior of the vessel 10. The vessel 10 has an inner polymer liner 20 covered by an outer composite shell 12. In this case, "composite" means a fiber reinforced resin matrix material, such as a filament wound or laminated structure. The composite shell 12 resolves structural loads on the vessel 10.

Although the liner 20 provides a gas barrier under typical operating conditions, the design of a pressure vessel 10 of this type produces a phenomenon wherein gas diffuses into the liner 20 under pressurization. When depressurization of the vessel 10 occurs, this gas diffuses into the interface or space between the liner 20 and the composite shell 12. A pocket of gas may thereby be formed, causing the liner 20 to bulge inward. At low pressure, laminate strain in the composite shell 12 is low, and microcracks in the shell 18 close up, effectively forming a seal; when a higher pressure is reached, those microcracks open up again, thereby allowing expulsion of the trapped pocket of gas. Thus, when the vessel 10 is re-pressurized, pressure builds up against liner 20, pushing against the trapped gas pocket, making the bulge in the liner 20 smaller until the gas is ultimately expelled through the composite shell 12 to the atmosphere. Such expulsion of gas through shell 12 may occur in a short time interval and can cause a significant concentration of gas to become present in the surroundings of the vessel 10. This may set off a leak detector around the vessel 10, when actually there is no steady leak from the liner 20.

SUMMARY

In one aspect, a pressure vessel has a first end with a first boss, the first boss having a first outer surface. The vessel includes a liner having a second outer surface, a shell disposed over the second outer surface, and a first vent. The first vent is etched onto at least a portion of the first outer surface and at least a portion of the second outer surface. The first vent includes a texture that provides a higher rate of gas flow through the first vent than through a portion of an interface of the liner and shell lacking the texture.

In another aspect, a pressure vessel has a first end and a second end. The first end has a first boss having a first outer surface, and the second end has a second boss having a second outer surface. The vessel includes a liner having a third outer surface, a shell disposed over the third outer surface, a plurality of first longitudinal vents and a plurality of second longitudinal vents. Each of the first longitudinal vents is etched onto a portion of the first outer surface and a portion of the third outer surface. Each of the first longitudinal vents includes a texture that provides a higher rate of gas flow through the first longitudinal vent than through a portion of an interface of the liner and shell lacking the texture. Each of the second longitudinal vents is etched onto a portion of the second outer surface and a portion of the third outer surface. Each of the second longitudinal vents includes a texture that provides a higher rate of gas flow through the second longitudinal vent than through a portion of an interface lacking the texture. At least one of first longitudinal vents is circumferentially offset around the pressure vessel from at least one of the second longitudinal vents.

This disclosure, in its various combinations, either in apparatus or method form, may also be characterized by the following listing of items:

1. A pressure vessel having a first end with a first boss, the first boss having a first outer surface, and the vessel including:
    a liner having a second outer surface;
    a shell disposed over the second outer surface; and
    a first vent formed onto at least a portion of the first outer surface and at least a portion of the second outer surface, the first vent including a texture that provides a higher rate of gas flow through the first vent than through a portion of an interface of the liner and shell lacking the texture.
2. The pressure vessel of item 1 wherein the first vent includes a nanotextured portion of the first outer surface and wherein the first vent includes a nanotextured portion of the second outer surface.
3. The pressure vessel of any of items 1-2 wherein the first vent is elongated.
4. The pressure vessel of item 3 wherein the first vent is aligned substantially parallel to a longitudinal axis of the pressure vessel.
5. The pressure vessel of any of items 1-4 wherein the pressure vessel has a cylindrical portion, and wherein the first vent extends at least from the cylindrical portion to the first boss.
6. The pressure vessel of item 5 wherein the first vent extends at least to a longitudinal midpoint of the pressure vessel.
7. The pressure vessel of any of items 1-6 wherein an end of the first vent is disposed on a neck of the first boss.
8. The pressure vessel of item 7 wherein the end is open to the atmosphere.
9. The pressure vessel of any of items 1-8 wherein the textures includes a plurality of peaks and valleys, and wherein a distance between adjacent peaks is preferably in a range between about 5 micrometers and about 20 micrometers, but the distance between adjacent peaks may longer or shorter.

10. A pressure vessel having a first end with a first boss having a first outer surface, the pressure vessel having a second end with a second boss having a second outer surface, the vessel including:
   a liner having a third outer surface;
   a shell disposed over the third outer surface;
   a plurality of first longitudinal vents, each of the first longitudinal vents formed onto a portion of the first outer surface and a portion of the third outer surface, each first longitudinal vent including a texture that provides a higher rate of gas flow through the first longitudinal vent than through a portion of an interface of the liner and shell lacking the texture; and
   a plurality of second longitudinal vents, each of the second longitudinal vents formed onto a portion of the second outer surface and a portion of the third surface, each second longitudinal vent including the texture, which provides a higher rate of gas flow through the second longitudinal vent than through a portion of the interface lacking the texture;
   wherein at least one of first longitudinal vents is circumferentially offset around the pressure vessel from at least one of the second longitudinal vents.

11. The pressure vessel of item 10 wherein at least one of the longitudinal vents is aligned substantially parallel to a longitudinal axis of the pressure vessel.

12. The pressure vessel of any of items 10-11 wherein at least one of the first and second longitudinal vents includes a nanotextured portion of the third outer surface.

13. The pressure vessel of any of items 10-12 wherein the pressure vessel has a cylindrical portion, and wherein at least one of the first longitudinal vents extends at least from the cylindrical portion to the first boss.

14. The pressure vessel of any of items 10-13 wherein an end of at least one of the first longitudinal vents is disposed on a neck of the first boss.

15. The pressure vessel of item 14 wherein the end is open to the atmosphere.

16. The pressure vessel of any of items 10-15 wherein at least one of the longitudinal vents extends at least to a longitudinal midpoint of the pressure vessel.

17. The pressure vessel of any of items 10-16 wherein the textures includes a plurality of peaks and valleys, and wherein a distance between adjacent peaks is preferably in a range between about 5 micrometers and about 20 micrometers, but the distance between adjacent peaks may longer or shorter.

18. A method for forming a pressure vessel including:
   providing a boss having a first outer surface;
   forming a liner in contact with the boss, the liner having a second outer surface; and
   forming a vent on the boss and liner by imparting a nanotexture on at least a portion of the first outer surface and at least a portion of the second outer surface.

19. The method of item 18, wherein imparting the nanotexture includes laser etching.

20. The method of any of items 18-19, wherein imparting the nanotexture includes chemical etching.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like and analogous structure or system elements are referred to by like reference numerals throughout the several views. All descriptions of structures apply equally to like or analogous structures.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some feature may be enlarged relative to other features for clarity. Moreover, where terms such as above, below, over, under, top, bottom, side, right, left, etc., are used, it is to be understood that they are used only for ease of understanding the description. It is contemplated that structures may be otherwise oriented.

DETAILED DESCRIPTION

Figure 1:
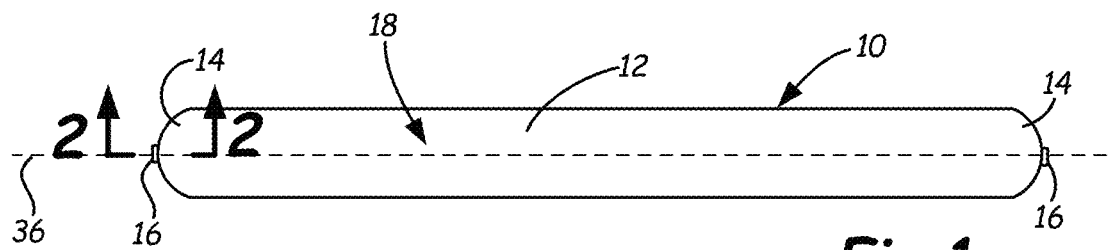
FIG. 1 is a side elevation view of a typical elongated pressure vessel.
Figure 2:
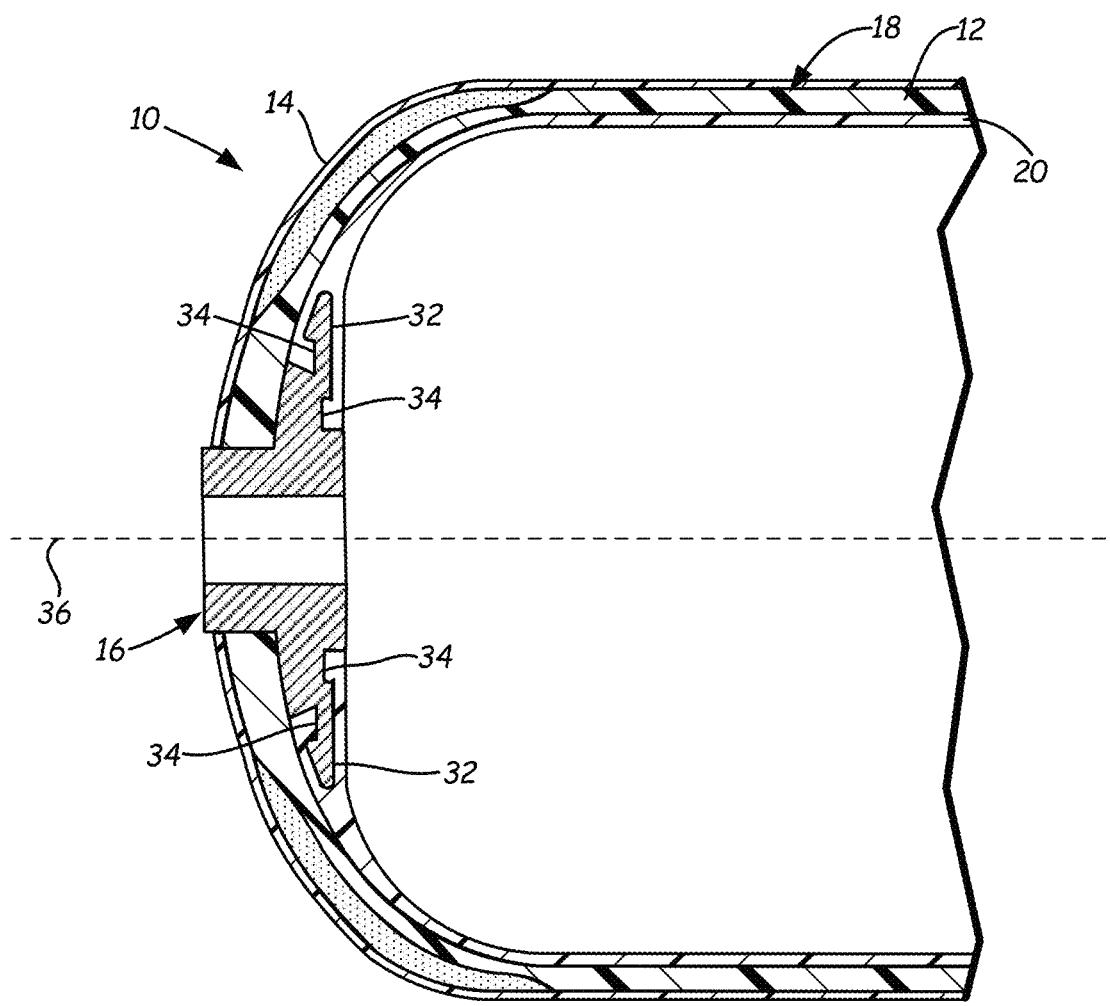
FIG. 2 is a partial cross-sectional view through one end of such a pressure vessel, taken along line 2-2 of FIG. 1.
Figure 3:
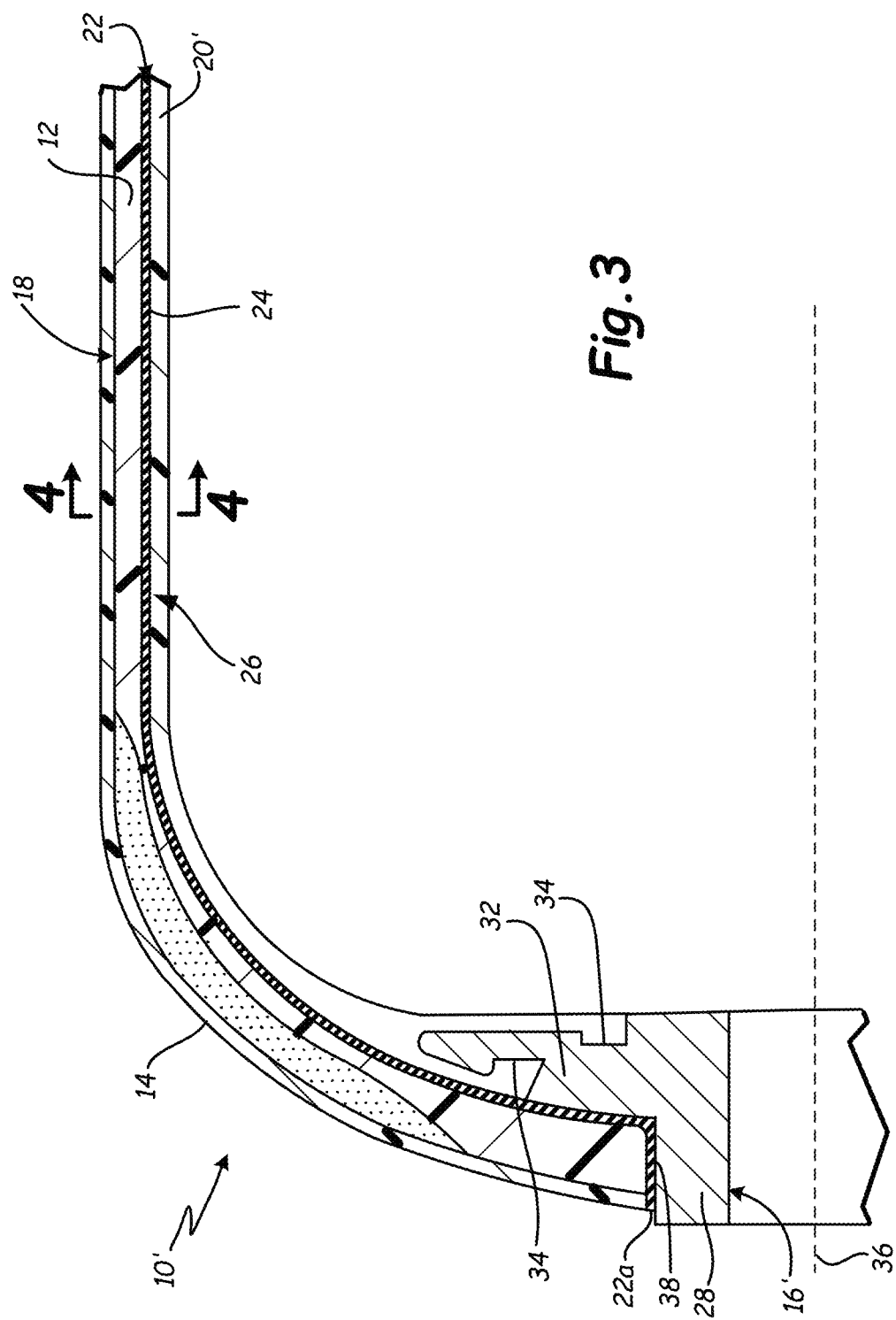
FIG. 3 is an enlarged partial cross-sectional view of a pressure vessel incorporating an exemplary embodiment of a nano-textured liner surface vent of the present disclosure.

This disclosure relates to providing a vent path to prevent gas and pressure build up between the liner 20' and the composite shell 12 of a pressure vessel 10'. This vent path allows gas, such as hydrogen, to escape at a steadier rate, preventing leak detector disturbances. Moreover, the disclosed vent path prevents the liner 20' from bulging or buckling inwardly, thereby preventing localized weakening that may result in shorter life of the liner 20'. Exemplary embodiments of such a vent path are provided as longitudinal vents 22 of FIGS. 3-5. As shown in FIG. 3, an end 22a of longitudinal vent 22 adjacent boss 16 is open to the atmosphere.

A method of forming a pressure vessel 10' includes mounting a boss 16 on a mandrel (not shown) and allowing a fluid polymer material for liner 20' to flow around flange 32 and into grooves 34 of boss 16. The liner material then solidifies, thereby forming liner 20', which is mechanically interlocked with boss 16. Accordingly, even under extreme pressure conditions, separation of liner 20' from boss 16 is prevented.

In some embodiments, the liner 20' can be made of plastic, elastomers, or other polymers, and can be manufactured by compression molding, blow molding, injection molding or any other generally known technique. In other embodiments, the liner 20' can include other materials, including but not limited to metals such as steel, aluminum, nickel, titanium, stainless steel, and any alloys thereof. Suitable metals can be generally characterized as having a high modulus of elasticity. In one embodiment, the liner 20' is formed of blow molded high density polyethylene (HDPE).

Figure 4:
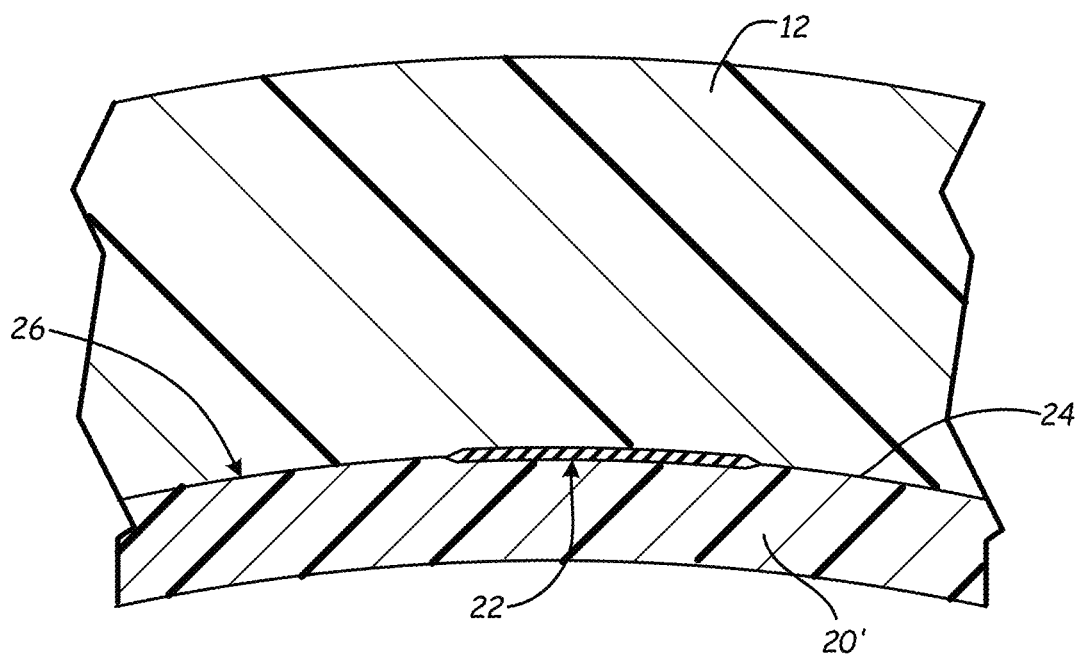
FIG. 4 is a partial cross-sectional view, taken along line 4-4 of FIG. 3, of a first exemplary longitudinal nano-textured liner surface vent at the interface of the liner and composite shell.

Referring to FIGS. 3 and 4, in forming vessel 10', prior to winding fibers of composite material around liner 20' to form shell 12, one or more vents 22 are etched onto at least a portion of outer surface 24 of the liner 20' and at least a portion of the outer surface of boss 16'. The etching provides a vent 22 having a rough surface texture at the liner and shell interface 26, wherein the texture provides a higher rate of gas flow through the vent 22 than through a portion of interface 26 lacking the texture. Vent 22 thereby providing a tortuous pathway along the roughened surface 24 of liner 20' for gas to escape from interface 26 between liner 20' and shell 12. An optional auxiliary outer layer may also be formed on shell 12.

Figure 5:
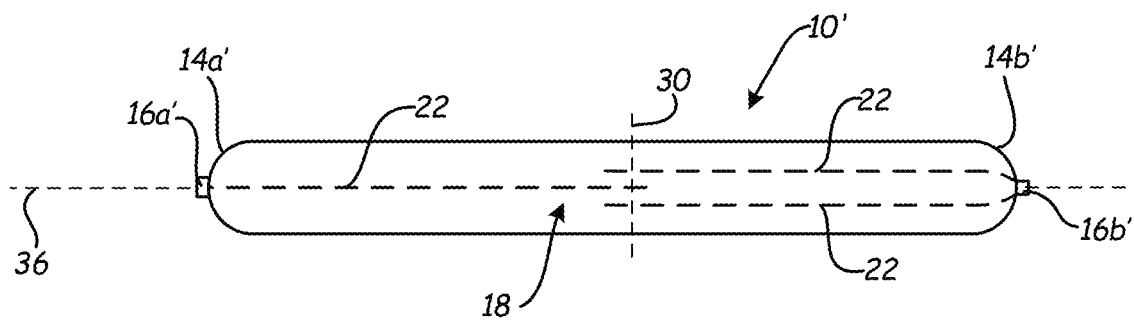
FIG. 5 is a side elevation view of an elongated pressure vessel incorporating exemplary arrangements of longitudinal nano-textured liner surface vents.
Figures 6A, 6B, 6C, 6D, 6E, 6F, 6G, 6H, 6I:
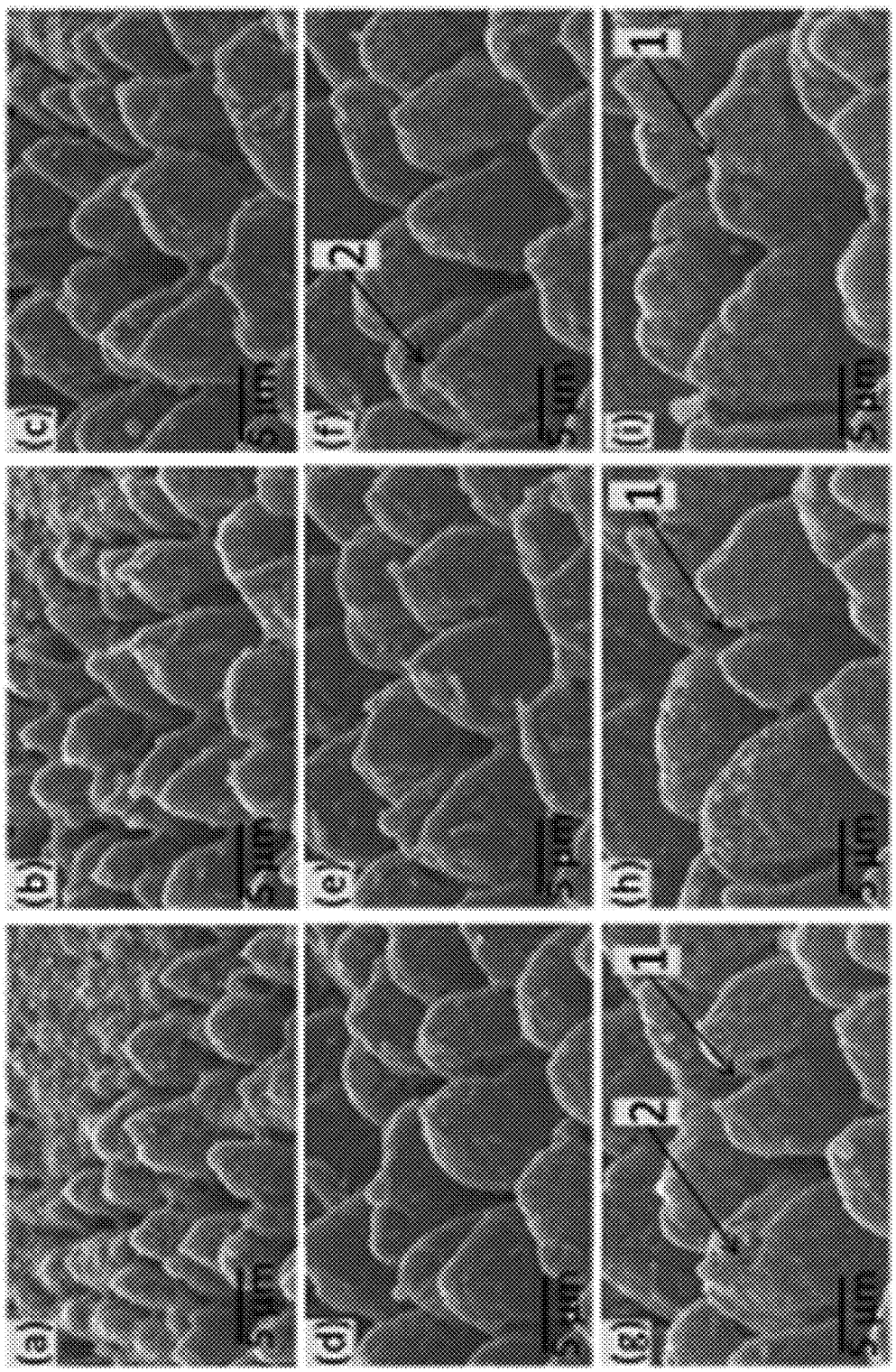
FIGS. 6(a)-6(i) are photographs showing topographical features of exemplary nano-textured liner surface vents.

As shown in FIG. 5, in an exemplary embodiment, each vent 22 extends from a boss 16' at least to center 30 of pressure vessel 10'. In an embodiment, a vent 22 may extend from a first boss 16a' all the way to a second boss 16b'. In still other embodiments, an etched vent surface may be provided substantially over an entire surface 24 of liner 20' facing shell 12, rather than along longitudinal pathways. As shown in FIG. 3, in an exemplary embodiment, an end of vent 22a is exposed to the atmosphere outside of pressure vessel 10'. The vent 22 defines a tortuous path on the etched surface portion of surface 24, through which fluid at the interface 26 between shell 12 and the underlying liner 20' and boss 16' can travel to exhaust at vent end 22a to the atmosphere. Vent 22 is formed by laser, chemical, or mechanical etching, for example, to modify at least portions of the outer surface 24 of the liner 20' and the outer surface of the boss 16'. In an exemplary embodiment, about three to about four laser etched vents 22 are provided for a pressure vessel 10'. However, the use of more or fewer vents 22 on a pressure vessel is also contemplated.

Outer shell 12 is formed surrounding the liner 20' and at least a portion of flange 32 of boss 16'. Suitable materials for shell 12 include a composite of laminated layers of wound fiberglass fibers or filaments or other synthetic filaments bonded together by a thermal-setting or thermoplastic resin. The fiber may be fiberglass, aramid, carbon, graphite, or any other generally known fibrous reinforcing material or combination of fibrous reinforcing materials. The resin matrix used may be epoxy, polyester, vinyl ester, thermoplastic or any other suitable resinous material capable of providing fiber to fiber bonding, fiber layer to layer bonding, and the fragmentation resistance required for the particular application in which the vessel is to be used. In an exemplary method, a dispensing head for the fibers moves in such a way as to wrap the fiber on the liner 20' in a desired pattern. If the vessel 10' is cylindrical, rather than spherical, fiber winding is normally applied in both a substantially longitudinal (helical) and a circumferential (hoop) wrap. This winding process is defined by a number of factors, such as resin content, fiber configuration, winding tension, and the pattern of the wrap in relation to the axis of the liner 20'. Details relevant to the formation of an exemplary pressure vessel are disclosed in U.S. Pat. No. 4,838,971, entitled "Filament Winding Process and Apparatus," which is incorporated herein by reference.

When fluid is contained in vessel 10' under pressure, some fluid may permeate through liner 20' and into the interface 26 between liner 20' and shell 12. The presence of gas at the interface 26 may compromise the sealed relationship of the boss 16 and liner 20', cause localized weakening of liner 20', and cause gas expulsion through shell 12 to the atmosphere outside vessel 10'. In an exemplary embodiment, a single or plurality of vents 22 are provided on exterior surface 24 of liner 20' to fluidly connect the interface 26 to the atmosphere via a designated pathway defined by the portion of surface 24 that is provided with a nanotexture, such as by etching.

In an exemplary embodiment, as illustrated by FIG. 5, longitudinal vents 22 extend from at least a boss 16a' or 16b' to a point near or past center 30 of the cylindrical main section 18 of the cylindrical vessel 10'. The center 30 of the cylindrical main body section 18 is typically the most compliant (i.e., same strength; but less edge support) portion of the vessel 10' and is thus the most likely area to exhibit bulging or buckling of the vessel liner 20 inwardly because of gas buildup. In an exemplary embodiment, at least one of the longitudinal vents 22 from boss 16a and at least one of the longitudinal vents 22 from boss 16b extends to and/or beyond the intermediate portion of the pressure vessel 10' proximate center 30. Thus, an arrangement of vents 22 as shown in FIG. 5 places about twice the number of vents 22 proximate center 30 compared to the number of vents proximate end sections 14a', 14b'.

On any particular vessel, only one longitudinal vent 22 may be required, such as shown in the left half of FIG. 5. Multiple longitudinal vents 22 may also be provided, however, such as shown in the right half of FIG. 5. In one exemplary embodiment, vents 22 are arranged so that circumferentially adjacent vents extend to opposite bosses 16a', 16b'. In such a case, a first plurality of longitudinal vents 22 are directed to the boss 16a' on one end 14a' of vessel 10' and a second plurality of longitudinal vents 22 are directed to the boss 16b' on the opposite end 14b' of vessel 10'. The two sets of longitudinal vents 22 are alternately arranged around the circumference of vessel 10' so that they extend alternately from the respective boss 16a', 16b' at least to center line 30. In the illustrated embodiment, two circumferentially adjacent longitudinal vents 22 are circumferentially offset from each other and are directed to opposite ends 14a', 14b' of vessel 10'. In yet another embodiment, a single longitudinal vent extends from one boss 16a' to the opposite boss 16b'. In the illustrated embodiment, pressure vessel 10' has an intermediate, substantially cylindrical portion proximate center 10.

In an exemplary embodiment, a vessel 10' having a length of about 24 inches to about 60 inches includes about four vents 22 having a width of about ¼ inch to about ½ inch each. However, it is contemplated that more or fewer, wider or narrower, vents 22 could be used on any vessel. While the illustrated embodiments show one or a plurality of discrete longitudinal vents 22, it is also contemplated that a more extensive venting layer may be used, wherein more of surface 24 liner 20' is provided with a nanotextured characteristic. Moreover, while vents 22 are illustrated as including straight lines, it is contemplated that the vents 22 may alternatively or additionally include a serpentine or other shape or configuration. It is contemplated that fewer or more vents 22 may be used on a pressure vessel 10'. Moreover, the vents 22 may be sized differently than in the exemplary embodiments. Additionally, while a plurality of vents 22 for a particular pressure vessel 10' may all be of the same size and shape and symmetrically placed about a circumference of pressure vessel 10', it is also contemplated that vents 22 may alternatively possess a combination of different sizes, shapes, changing widths, and placements in a single pressure vessel.

FIGS. 6(a)-6(i) are photographs showing topographical features of exemplary nano-textured vents 22. As shown in FIG. 3, a texturing or etching process is completed on the outer surface 24 of liner 20' and the outer surface of flange 32 and neck 28 of boss 16 to form vents 22. Such a texturing or etching process may be accomplished with sandblasting, knurling, laser light, chemicals, nano-silica particle blasting, or other means of imparting surface deformities to outer surface 24 of liner 20'. While etching processes generally remove material from a surface, other suitable ways of imparting surface deformities to outer surface 24 of liner 20' including depositing material on outer surface 24 of liner 20' to form a textured surface capable of providing a higher gas flow rate thereon compared to an adjacent surface without material deposited thereon. The resulting surface of vent 22, embodiments of which are shown in FIGS. 6(a)-6(i), includes a plurality of surface peaks (some of which are labeled with reference numbers 1 and 2) and valleys between the peaks. A 5 micrometer (5,000 nanometer) length gauge is shown in FIGS. 6(a)-6(i). In an exemplary embodiment, each vent 22 has a surface texture in which a distance between adjacent surface peaks averages between about 5 micrometers (5,000 nanometers) and about 20 micrometers (20,000 nanometers). Because of the small scale of the textured surface, it is sometimes referred to as a "nanotextured surface." The "nanotextured surface" is to be distinguished from surfaces having macro-scale features such as machined channels and grooves. In an exemplary embodiment, the surface texture of vents 22 is fine enough that liquids such as the matrix (e.g., resin and filament) material for shell 12 does not fully penetrate or wet the surface, but rather floats on the peaks, thereby allowing a porous gas vent path 22 to remain within the valleys of the nanotextured portion of surface 24.

An exemplary, non-limiting embodiment of a pressure vessel 10' is described and shown. In an exemplary embodiment, such as illustrated in FIGS. 3-5, pressure vessel 10' has a first end 14a' with a first boss 16a', the first boss 16a' having a first outer surface 38. Liner 20' has a second outer surface 24. A composite shell 12 is disposed over the second outer surface 24. A first vent 22 is etched onto at least a portion of the first outer surface 38 and at least a portion of the second outer surface 24, the first vent 22 including a texture that provides a higher rate of gas flow through the first vent 22 than through a portion of an interface 26 of the liner 20' and shell 12 lacking the texture.

In an exemplary embodiment, the first vent 22 includes a nanotextured portion of the first outer surface 38 and a nanotextured portion of the second outer surface 24. In an exemplary embodiment, the first vent 22 is elongated. In an exemplary embodiment, the first vent 22 is aligned substantially parallel to a longitudinal axis 36 of the pressure vessel 10'. In an exemplary embodiment, the pressure vessel 10' has a cylindrical portion 18, and the first vent 22 extends at least from the cylindrical portion 18 to the first boss 16a'. In an exemplary embodiment, the first vent 22 extends at least to a longitudinal midpoint 30 of the pressure vessel 10'. In an exemplary embodiment, an end 22a of the first vent 22 is disposed on a neck 28 of the first boss 16a'. In an exemplary embodiment, the end 22a is open to the atmosphere. In an exemplary embodiment, the textures includes a plurality of peaks and valleys, and a distance between adjacent peaks is in a range between about 5 micrometers and about 20 micrometers, as illustrated in FIGS. 6(a)-6(i).

In an exemplary embodiment, a pressure vessel 10' has a first end 14a' with a first boss 16a' having a first outer surface 38 and a second end 14b' with a second boss a 16b' having a second outer surface 38. A liner 20' has a third outer surface 24. A shell 12 is disposed over the third outer surface 24. A plurality of first longitudinal vents 22 is etched onto a portion of the first outer surface 38 and a portion of the third outer surface 24, each first longitudinal vent 22 including a texture that provides a higher rate of gas flow through the first longitudinal vent 22 than through a portion of an interface 26 of the liner 20' and shell 12 lacking the texture. A plurality of second longitudinal vents 22 is etched onto a portion of the second outer surface 38 and a portion of the third outer surface 24, each second longitudinal vent 22 including a texture that provides a higher rate of gas flow through the second longitudinal vent 22 than through a portion of an interface 26 of the liner 20' and shell 12 lacking the texture. In an exemplary embodiment, at least one of first longitudinal vents 22 is circumferentially offset around the pressure vessel 10' from at least one of the second longitudinal vents 22. In an exemplary embodiment, at least one of the longitudinal vents 22 is aligned substantially parallel to a longitudinal axis 36 of the pressure vessel 10'. In an exemplary embodiment, at least one of the first and second longitudinal vents 22 includes a nanotextured portion of the third outer surface 24.

In an exemplary embodiment, the pressure vessel 10' has a cylindrical portion 18, and at least one of the first longitudinal vents 22 extends at least from the cylindrical portion 18 to the first boss 16a'. In an exemplary embodiment, an end 22a of at least one of the first longitudinal vents 22 is disposed on a neck 28 of the first boss 16'. In an exemplary embodiment, the end 22a is open to the atmosphere. In an exemplary embodiment, at least one of the longitudinal vents 22 extends at least to a longitudinal midpoint 30 of the pressure vessel 10'. In an exemplary embodiment, the textures includes a plurality of peaks and valleys, and a distance between adjacent peaks is in a range between about 5 micrometers and about 20 micrometers, as illustrated in FIGS. 6(a)-6(i).

In an exemplary embodiment, a method for forming a pressure vessel 10' includes providing a boss 16' having a first outer surface 38; forming a liner 20' in contact with the boss 16', the liner 20' having a second outer surface 24; and forming a vent 22 on the boss 16' and liner 20' by imparting a nanotexture on at least a portion of the first outer surface 38 and at least a portion of the second outer surface 24. In an exemplary embodiment, imparting the nanotexture includes laser etching. In an exemplary embodiment, imparting the nanotexture includes chemical etching.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. A pressure vessel including:
   a liner having an outer surface;
   a shell disposed over the outer surface; and
   a vent including a nanotextured portion of the outer surface of the liner, the vent including a texture that provides a higher rate of gas flow through the vent than through a portion of an interface of the liner and shell lacking the texture.

2. The pressure vessel of claim 1 wherein the vent is elongated.

3. The pressure vessel of claim 2 wherein the vent is aligned substantially parallel to a longitudinal axis of the pressure vessel.

4. The pressure vessel of claim 1 wherein the pressure vessel has a cylindrical portion, and wherein the vent extends at least from the cylindrical portion to an end of the pressure vessel.

5. The pressure vessel of claim 4 wherein the vent extends at least to a longitudinal midpoint of the pressure vessel.

6. The pressure vessel of claim 1 wherein an end of the vent is disposed on a neck of a boss.

7. The pressure vessel of claim 1 wherein an end of the vent is open to the atmosphere.

8. The pressure vessel of claim 1 wherein the texture includes a plurality of peaks and valleys, and wherein a distance between adjacent peaks is in a range between about 5 micrometers and about 20 micrometers.

9. A pressure vessel having a first end and a second end, the vessel including:
   a liner having an outer surface;
   a shell disposed over the outer surface;
   a first longitudinal vent including a nanotextured first portion of the outer surface of the liner and including a texture that provides a higher rate of gas flow through the first longitudinal vent than through a portion of an interface of the liner and shell lacking the texture; and
   a second longitudinal vent including a nanotextured second portion of the outer surface of the liner and including the texture, which provides a higher rate of gas flow through the second longitudinal vent than through a portion of the interface lacking the texture;
   wherein the first longitudinal vent is circumferentially offset around the pressure vessel from the second longitudinal vent.

10. The pressure vessel of claim 9 wherein at least one of the longitudinal vents is aligned substantially parallel to a longitudinal axis of the pressure vessel.

11. The pressure vessel of claim 9 wherein at least one of the first and second longitudinal vents includes a nanotextured portion on a boss.

12. The pressure vessel of claim 9 wherein the pressure vessel has a cylindrical portion, and wherein at least one of the first or second longitudinal vents extends at least from the cylindrical portion to a boss.

13. The pressure vessel of claim 9 wherein an end of at least one of the first or second longitudinal vents is disposed on a neck of a boss.

14. The pressure vessel of claim 9 wherein an end of at least one of the first or second longitudinal vents is open to the atmosphere.

15. The pressure vessel of claim 9 wherein at least one of the longitudinal vents extends at least to a longitudinal midpoint of the pressure vessel.

16. The pressure vessel of claim 9 wherein the texture includes a plurality of peaks and valleys, and wherein a distance between adjacent peaks is in a range between about 5 micrometers and about 20 micrometers.

* * * * *